(12) United States Patent
Motamedi et al.

(10) Patent No.: US 8,713,975 B2
(45) Date of Patent: *May 6, 2014

(54) LAUNDRY TREATING APPLIANCE CONTROL SYSTEM

(75) Inventors: Nima Motamedi, Saint Joseph, MI (US); Jung Eui E. Seo, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1135 days.

This patent is subject to a terminal disclaimer.

(21) Appl. No.: 12/640,514

(22) Filed: Dec. 17, 2009

(65) Prior Publication Data

US 2011/0153085 A1    Jun. 23, 2011

(51) Int. Cl.
*D06F 33/02*    (2006.01)
(52) U.S. Cl.
USPC .......................................... 68/12.23
(58) Field of Classification Search
USPC .......................................... 68/12.23
See application file for complete search history.

(56) References Cited

U.S. PATENT DOCUMENTS

| | | | |
|---|---|---|---|
| 4,800,740 A | 1/1989 | Huttemann |
| 5,012,299 A | 4/1991 | Sawamura et al. |
| 5,124,942 A | 6/1992 | Nielsen et al. |
| 5,617,526 A | 4/1997 | Oran et al. |
| 5,930,009 A | 7/1999 | Sato et al. |
| 7,136,188 B2 | 11/2006 | Kondo |
| 7,145,574 B2 | 12/2006 | Kondo |
| 7,489,306 B2 | 2/2009 | Kolmykov-Zotov et al. |
| 7,512,900 B2 | 3/2009 | Lynch et al. |
| 2002/0163545 A1 | 11/2002 | Hii |
| 2003/0193474 A1 | 10/2003 | Yamamoto |
| 2005/0120306 A1 | 6/2005 | Klassen et al. |
| 2005/0151758 A1 | 7/2005 | Sapp |
| 2007/0163376 A1 | 7/2007 | Baldet |
| 2007/0192731 A1 | 8/2007 | Townsend et al. |
| 2008/0114521 A1 | 5/2008 | Doering |
| 2008/0282158 A1 | 11/2008 | Aaltonen et al. |
| 2008/0314423 A1 | 12/2008 | Berends et al. |
| 2009/0002324 A1 | 1/2009 | Harbeson et al. |
| 2009/0013275 A1 | 1/2009 | May et al. |

FOREIGN PATENT DOCUMENTS

| | | |
|---|---|---|
| DE | 3941665 A1 | 6/1991 |
| EP | 0725181 B1 | 5/2003 |
| EP | 1369770 A1 | 12/2003 |
| EP | 2015176 A1 | 1/2009 |
| EP | 2017701 A1 | 1/2009 |
| WO | 00/75766 A1 | 12/2000 |
| WO | 2006/087735 A1 | 8/2006 |
| WO | 2007/011280 A1 | 1/2007 |
| WO | WO2007/011280 A1 * | 1/2007 ............ D06F 33/02 |

OTHER PUBLICATIONS

German Search for DE102010036562, Feb. 9, 2012.
Grossman, T. and Balakrishnan, R. (Apr. 2-7, 2005). The Bubble Cursor: Enhancing Target Acquisition by Dynamic Resizing of the Cursor's Activation Area. ACM CHI Conference on Human Factors in Computing Systems. p. 281-290.

* cited by examiner

*Primary Examiner* — Michael Barr
*Assistant Examiner* — Jason Riggleman

(57) ABSTRACT

A control system for a fabric treating appliance configured to determine one or more operating parameters of a cycle of operation as a function of a user-selected performance goal weighting.

13 Claims, 7 Drawing Sheets

LAUNDRY TREATING APPLIANCE CONTROL SYSTEM

BACKGROUND OF THE INVENTION

Laundry treating appliances, such as a washing machine or a clothes dryer, may implement a cycle of operation on a load of laundry placed inside a treatment chamber of the laundry treating appliance according to the settings of one or more operating parameters. The operating parameters may be set automatically by the laundry treating appliance based on input received from one or more sensors associated with the laundry treating appliance or based on input received from a user. In some instances, it may be difficult for a user to know what input to provide to the laundry treating appliance to achieve a desired outcome.

SUMMARY OF THE INVENTION

A control system for a laundry treating appliance having a plurality of components that are operated to implement a cycle of operation, having multiple operating parameters, on a load of laundry received within a treating chamber of the appliance, may comprise a performance goal landscape, a user-controllable weighting selector and a controller. The performance goal landscape may be subdivided into multiple goal areas, each goal area representing a different performance goal for the cycle of operation. The user controllable weighting selector may have a bound weighting area moveable of the landscape. The controller may be operably coupled to the performance goal landscape and the weighting selector to determine a goal weighting based on the relative proportion of at least one goal area within the weighting area and set a value for at least one of the multiple operating parameters based on the determined goal weighting. The user may control the performance goals of the cycle of operation by moving the weighting selector relative to the landscape to change the goal weighting by changing the relative proportion of the goal areas within the weighting area.

DESCRIPTION OF EMBODIMENTS OF THE INVENTION

Figure 1:
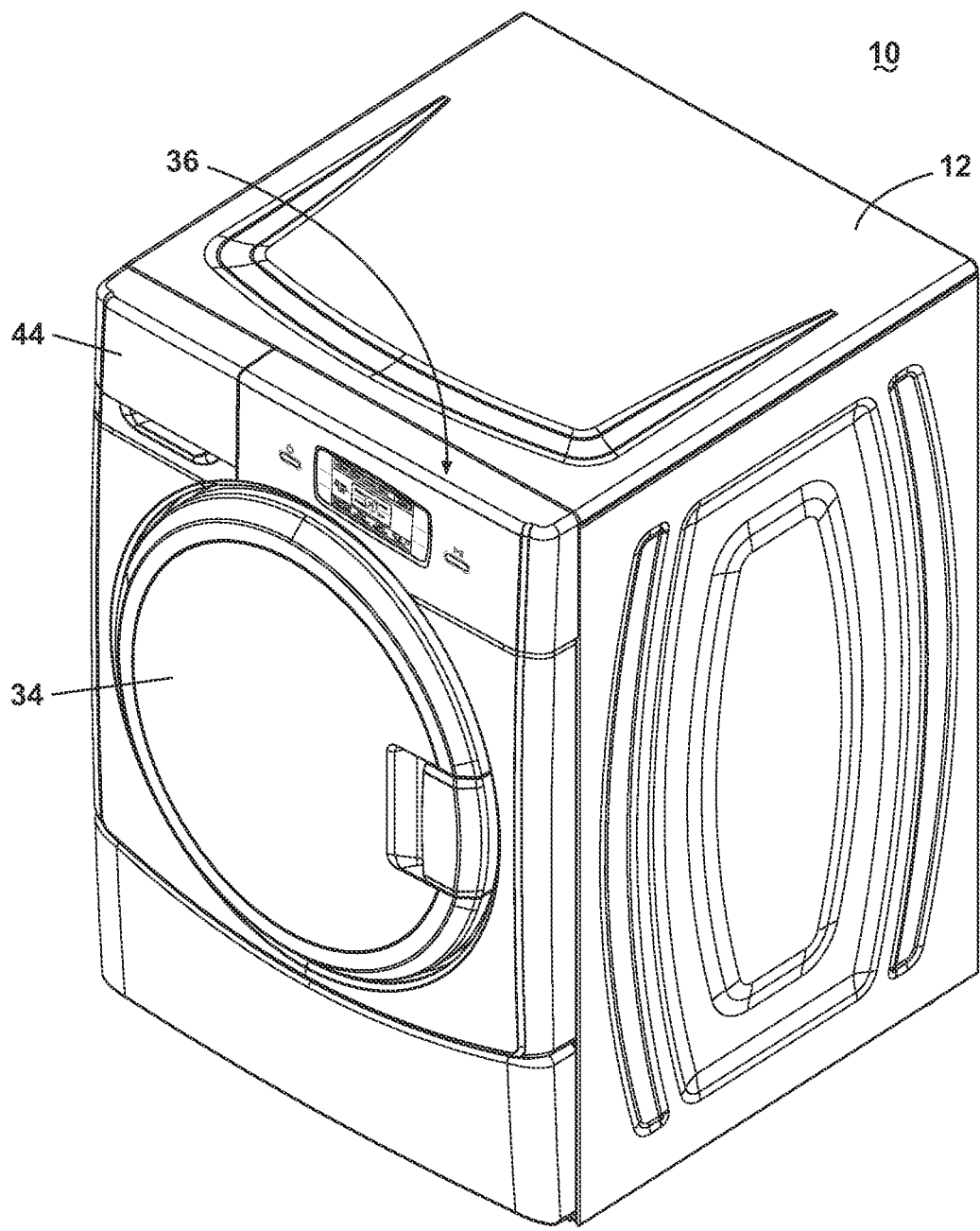
FIG. 1 is a perspective view of an exemplary fabric treating appliance in the form of a washing machine with an exemplary user interface according to a first embodiment of the invention.

FIG. 1 illustrates one embodiment of a laundry treating appliance according to the invention. The laundry treating appliance 10 according to the invention may be any appliance which performs a cycle of operation on laundry, non-limiting examples of which include a horizontal or vertical axis washing machine; a horizontal or vertical axis automatic dryer; a combination washing machine and dryer; a tumbling or stationary refreshing/revitalizing machine; an extractor; a non-aqueous washing apparatus; and a revitalizing machine. The laundry treating appliance 10 described herein shares many features of a traditional automatic washing machine, which will not be described in detail except as necessary for a complete understanding of the invention.

Figure 2:
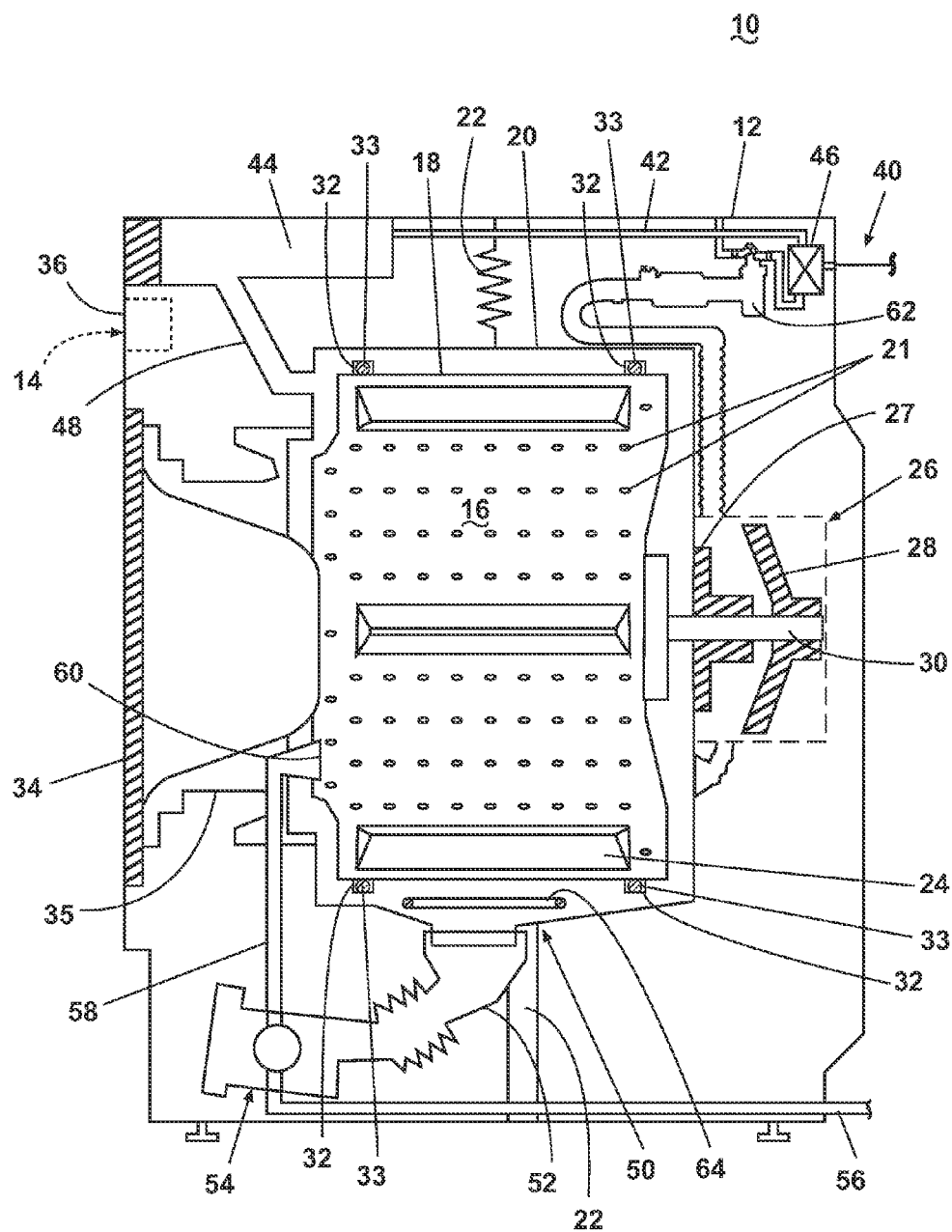
FIG. 2 is a schematic view of the fabric treating appliance of FIG. 1 according to the first embodiment of the invention.

FIG. 2 provides a schematic view of the washing machine 10 that may include a cabinet 12 having a controller 14 for controlling the operation of the washing machine 10 to complete a cycle of operation. A treating chamber 16 may be defined by a rotatable drum 18 located within the cabinet 12 for receiving laundry to be treated during a cycle of operation. The rotatable drum 118 may be mounted within a tub 20 and may include a plurality of perforations 21, such that liquid may flow between the tub 20 and the drum 18 through the perforations 21.

The drum 18 may further include a plurality of baffles 24 disposed on an inner surface of the drum 18 to lift the laundry load contained in the laundry treating chamber 16 while the drum 18 rotates. A motor 26 may be directly coupled with the drive shaft 30 to rotate the drum 18. The motor 26 may be a brushless permanent magnet (BPM) motor having a stator 27 and a rotor 28. Alternately, the motor 26 may be coupled to the drum 18 through a belt and a drive shaft to rotate the drum 18, as is known in the art. Other motors, such as an induction motor or a permanent split capacitor (PSC) motor, may also be used. The motor 26 may rotate the drum 18 at various speeds in either rotational direction.

Both the tub 20 and the drum 18 may be selectively closed by a door 34. A bellows 35 couples an open face of the tub 20 with the cabinet 12, and the door 34 seals against the bellows 35 when the door 34 closes the tub 20.

The cabinet 12 may also include a user interface 36 that may include one or more knobs, switches, displays, and the like for communicating with the user, such as to receive input and provide output. For example, the user interface 36 may include a power button 38 for activating the washing machine 10 and a start/pause button 39 for initiating or pausing an activity of the washing machine 10, such as a cycle of operation.

While the illustrated washing machine 10 includes both the tub 20 and the drum 18, with the drum 18 defining the laundry treating chamber 16, it is within the scope of the invention for the washing machine 10 to include only one receptacle, with the receptacle defining the laundry treating chamber for receiving the laundry load to be treated.

The washing machine 10 of FIG. 2 may further include a liquid supply and recirculation system. Liquid, such as water, may be supplied to the washing machine 10 from a water supply 40, such as a household water supply. A supply conduit 42 may fluidly couple the water supply 40 to the tub 20 and a treatment dispenser 44. The supply conduit 42 may be provided with an inlet valve 46 for controlling the flow of liquid from the water supply 40 through the supply conduit 42 to either the tub 20 or the treatment dispenser 44.

A liquid conduit 48 may fluidly couple the treatment dispenser 44 with the tub 20. The liquid conduit 48 may couple with the tub 20 at any suitable location on the tub 20 and is shown as being coupled to a front wall of the tub 20 in FIG. 2 for exemplary purposes. The liquid that flows from the treatment dispenser 44 through the liquid conduit 48 to the tub 20 typically enters a space between the tub 20 and the drum 18 and may flow by gravity to a sump 50 formed in part by a lower portion of the tub 20. The sump 50 may also be formed by a sump conduit 52 that may fluidly couple the lower portion of the tub 20 to a pump 54. The pump 54 may direct fluid to a drain conduit 56, which may drain the liquid from the washing machine 10, or to a recirculation conduit 58, which may terminate at a recirculation inlet 60. The recirculation inlet 60 may direct the liquid from the recirculation conduit 58 into the drum 18. The recirculation inlet 60 may introduce the liquid into the drum 18 in any suitable manner, such as by spraying, dripping, or providing a steady flow of the liquid.

The liquid supply and recirculation system may further include one or more devices for heating the liquid such as a steam generator 62 and/or a sump heater 64.

The steam generator 62 may be provided to supply steam to the treating chamber 16, either directly into the drum 18 or indirectly through the tub 20 as illustrated. The valve 46 may also be used to control the supply of water to the steam generator 62. The steam generator 62 is illustrated as a flow through steam generator, but may be other types, including a tank type steam generator. Alternatively, the heating element 64 may be used to generate steam in place of or in addition to the steam generator 62. The steam generator 62 may be controlled by the controller 14 and may be used to heat to the laundry as part of a cycle of operation, much in the same manner as heating element 64. The steam generator 62 may also be used to introduce steam to treat the laundry as compared to merely heating the laundry.

Additionally, the liquid supply and recirculation system may differ from the configuration shown in FIG. 2, such as by inclusion of other valves, conduits, wash aid dispensers, sensors, such as water level sensors and temperature sensors, and the like, to control the flow of liquid through the washing machine 110 and for the introduction of more than one type of detergent/wash aid. Further, the liquid supply and recirculation system need not include the recirculation portion of the system or may include other types of recirculation systems.

Figure 3:
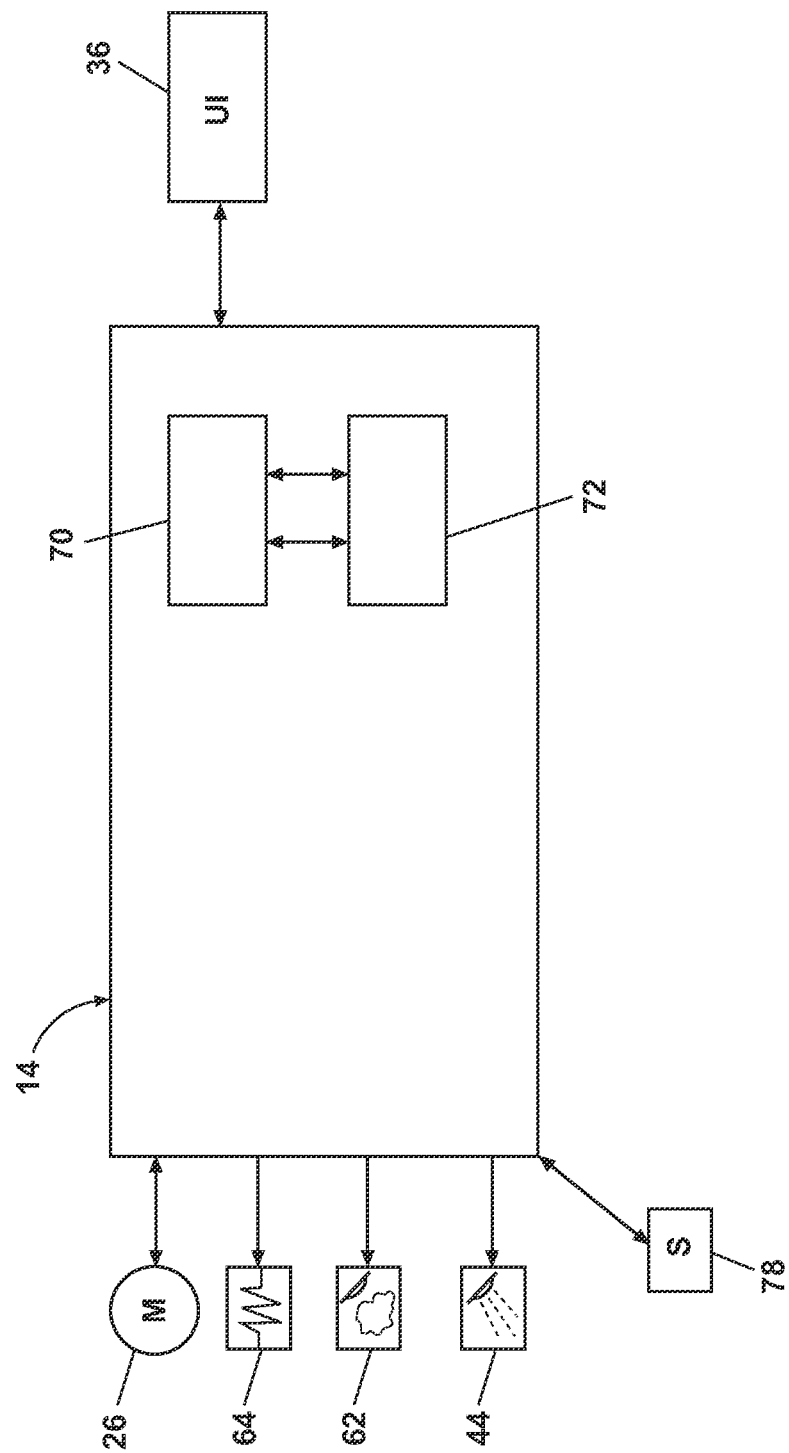
FIG. 3 is a schematic view of an exemplary control system of the fabric treating appliance of FIG. 1 according to the first embodiment of the invention.

As illustrated in FIG. 3, the controller 14 may be provided with a memory 70 and a central processing unit (CPU) 72. The memory 70 may be used for storing the control software that is executed by the CPU 72 in completing a cycle of operation using the washing machine 10 and any additional software. For example, the memory 70 may store one or more pre-programmed cycles of operation that may be selected by a user and completed by the washing machine 10. The memory 70 may also be used to store information, such as a database or table, and to store data received from one or more components of the washing machine 10 that may be communicably coupled with the controller 14.

The controller 14 may also receive input from one or more sensors 78, which are known in the art and not shown for simplicity. Non-limiting examples of sensors 78 that may by communicably coupled with the controller 114 include: a treating chamber temperature sensor, a moisture sensor, a weight sensor, a position sensor and a motor torque sensor.

The controller 14 may be operably coupled with one or more components of the washing machine 10 for communicating with and controlling the operation of the component to complete a cycle of operation. For example, the controller 14 may be coupled with the motor 26 for controlling the direction and speed of rotation of the drum 18 and the treatment dispenser 44 for dispensing a treatment during a cycle of operation. The controller 14 may also be coupled with the user interface 36 for receiving user selected inputs and communicating information to the user.

The controller 14 may control the components of the washing machine 10 to complete one of the pre-programmed cycles of operation stored in the controller memory 70 based on a setting of one or more operating parameters. The pre-programmed cycles of operation may correspond to a type of fabric, a soil level, color or an amount or size of one or more laundry items in the load, for example. The operating parameters may be set to control the components of the washing machine 10 to provide the recommended fabric care for the selected cycle of operation.

The operating parameters may be considered quantitative in the sense that a measurable input value to control the operation of the component results in a measurable output. The operating parameters may be set automatically by the controller 14 when the user selects one of the pre-programmed cycles of operation stored in the controller memory 70. Alternatively, one or more of the operating parameters may be set by the user to modify one of the pre-programmed cycles of operation according to the user's preferences. For example, the user may select a cycle of operation and then manually adjust the wash temperature to a desired wash temperature different than the default temperature for the selected cycle. In another example, one or more operating parameters may be set automatically based on one or more characteristics of the laundry load input manually by the user through the interface 36 or automatically determined by the controller 14 based on input received from one or more sensors. For example, the controller 14 may automatically adjust the amount of water used during a rinse phase based on the amount of laundry, determined either based on user input or automatically by a load sensor.

Non-limiting examples of quantitative operating parameters include temperature, drum speed, amount of water used, duration of a cycle or phase of a cycle, an amount and/or concentration of a treatment to dispense, a time to dispense a treatment, a duration of a soak or pre-soak phase, a temperature of a soak or pre-soak, a tumble speed and duration, a spin speed and duration, an imbalance limit, a cycle or cycle phase delay and a number of times a phase in the cycle is repeated (e.g. the number of rinses). Non-limiting examples of a treatment that may be dispensed include steam, water, a detergent, an oxygen-based bleach, a chlorine-based bleach, a stain treatment or prevention chemistry, a fragrance, an anti-wrinkle agent and an anti-static agent. The quantitative operating parameters may also include the on/off or yes/no selection of a parameter, non-limiting examples of which include to use steam, dispense a treatment, perform an extra rinse and perform a soak or pre-soak phase.

The user interface 36 may also include a touch-sensitive display or touch screen 100 for receiving input from a user and displaying output to the user. The controller 14 may receive input from the user through the touch screen 100 and display visual output to the user in the form of graphics, texts, icons, video and any combination thereof. The touch screen 100 may receive input from the user based on tactile contact, such as by a user touching the touch screen 100 with an object, such as a finger. The controller 14 may detect contact, including movement of the contact, on the touch screen 14 and convert the detected contact into interaction with the objects (graphics, texts, icons, etc. . . . ) displayed on the touch screen 100. The controller 14 may be programmed to detect contact and movement of a contact according to any known methodology.

The touch screen 100 may be any suitable type of touch screen display, such as a liquid crystal display (LCD) or light emitting polymer display (LPD). Non-limiting examples of suitable touch sensing technologies that may be used with the touch screen 100 include capacitive, resistive, infrared, pressure and surface acoustic waves.

The controller 14 may be provided with software in the controller memory 70 which may be executed by the CPU 72 to sequentially display on the touch screen 100 and navigate through a variety of input/output screens based on the user input received from the touch screen display 100. Each input/output screen may provide the user with the opportunity to input information to control the operation of the washing machine 10 and may provide output to communicate information with the user.

For example, upon turning on of the washing machine 10, an input/output screen may be presented to the user, prompting the user to select a desired cycle of operation from a plurality of available user-selectable cycles. Based on the cycle selected by the user, additional input/output screens may be displayed in which the user may modify the selected cycle by adjusting one or more operating parameters or by providing input upon which the controller 14 may automatically modify the selected cycle of operation. Each subsequent input/output screen displayed to the user on the touch screen 100 may be based on user input from the previously displayed input/output screen.

As discussed above, the controller 14 may be pre-programmed with any number of user-selectable operating cycles that a user may select to complete a cycle of operation on a load of laundry. However, the user may desire to modify or tailor these pre-programmed cycles according to the user's preferences and/or characteristics of the load to achieve a specific goal or outcome. In some cases, a user may intuitively know how to adjust an operating parameter of a cycle to achieve a desired outcome, such as when the desired outcome is quantitative and is directly linked to a quantitative operating parameter. For example, if the user desires to wash the laundry at a higher temperature, the user may manually adjust the temperature of the wash to a higher temperature. In this manner, the desired outcome is directly related to the operating parameter responsible for controlling the outcome.

In some cases, however, the user may not know how to modify the operating parameters of an operating cycle to achieve a desired goal. For example, if the user's goal is related to the overall performance of the cycle and/or machine, the user may not know how and/or may not be able to adjust multiple operating parameters to achieve the performance goal. Non-limiting examples of performance goals include conducting an operating cycle that is cleaner, quicker, gentler, more environmentally friendly (e.g. less energy and/or less water), more energy efficient and dryer, in the case of a drying machine.

The performance goals may be considered qualitative goals in that they are not necessarily directly effected by the modification of any one operating parameter. For example, the user may select a cycle of operation, such as a normal wash cycle, and then desire to modify the cycle so that the cycle is more gentle. The user may not know how, or may not be provided with the opportunity, to modify the necessary operating parameters to conduct the selected cycle to achieve the performance goal of a gentler normal wash cycle. In addition, the user may desire to modify a cycle to achieve varying levels of a performance goal. For example, the user may desire to modify the level or extent of gentleness for a selected cycle.

In addition, the modification of one or more operating parameters to achieve one performance goal may negatively impact other performance goals. For example, modifications of one or more operating parameters to achieve the user-selected performance goal of a cleaner operating cycle may result in longer cycle times, negatively impacting the performance goal of a quicker operating cycle. The impact of achieving one performance goal on the outcome of other performance goals is not necessarily intuitively apparent to the user. Therefore, it may be useful to communicate to the user the impact of modifying an operating cycle to achieve one performance goal on the ability of the operating cycle to achieve other performance goals.

Figure 4:
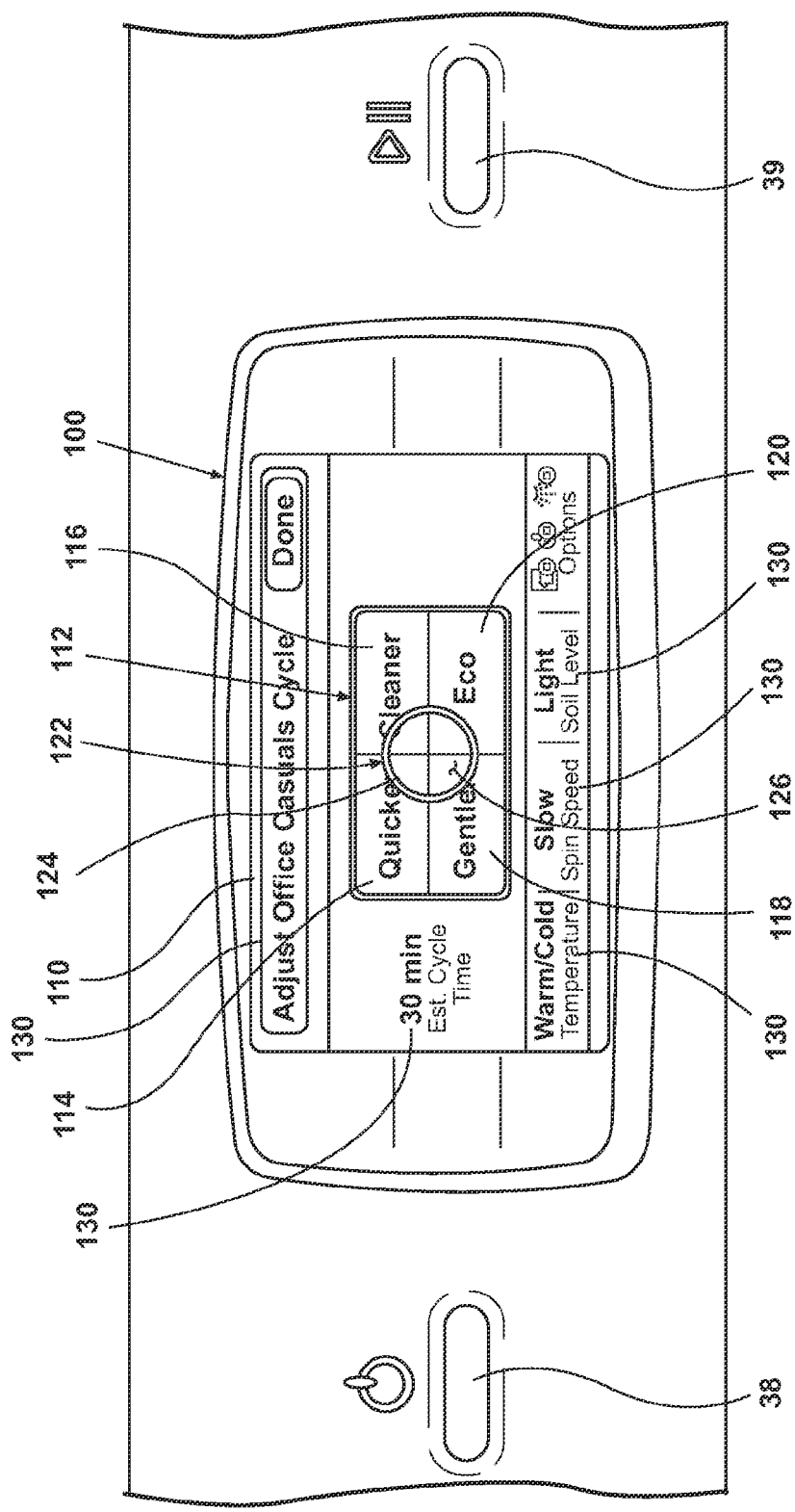
FIG. 4 is a front view of a user interface displaying a performance goal selection screen according to a second embodiment of the invention.

Referring now to FIG. 4, the user may select a performance goal through the touch screen 100 and the controller 14 may adjust the operating parameters of a cycle of operation to achieve the selected performance goal. The selection of the performance goal may be a function of the weighting or priority the user gives to one or more of the available performance goals displayed on the touch screen 100. The controller may be pre-programmed to modify the operating parameters of a cycle of operation as a function of the weighting given to the performance goals by the user based on empirical data or according to one or more functions.

The touch screen 100 may display a performance goal selection input/output screen 110 through which the user may select a desired performance goal by weighting the priority of each performance goal relative to the other performance goals. The performance goal selection screen 110 may include a performance goal landscape 112 that may be sub-divided into multiple areas, each area corresponding to a user-selectable performance goal. As illustrated in FIG. 4, the performance goal landscape 112 may be sub-divided into four goal areas 114, 116, 118 and 120 corresponding to four user-selectable performance goals "Quicker", "Cleaner", "Gentler" and "Eco" (environmentally friendly), respectively. It is within the scope of the invention for the performance goal landscape 112 to be sub-divided into any number of goal areas corresponding to any number of user-selectable performance goals.

It is within the scope of the invention for the touch screen 100 to have any shape and display additional output in addition to the performance goal selection screen 110 that may or may not be related to the performance goal selection screen 110, such as icons or text to navigate away from the performance goal selection screen, to start a cycle of operation, to adjust other parameters of the operating cycle, to select an operating cycle, status indicators and a help button.

The performance goal selection screen 110 may also include a weighting selector 122 which may be selectively moved by the user over the performance goal landscape 112 to weight a performance goal. The weighting selector 122 has a boundary 124 defining a weighting area 126. The weighting selector 122 may be in the form of any regular or irregular polygon. For example, the weighting selector 122 may be in the form of bubble, as illustrated in FIG. 4.

The performance goal selection screen 110 may further be provided with one or more operating cycle output displays 130 in the form of text and/or graphics to communicate information relating to the cycle and/or one or more operating parameters. Non-limiting examples of cycle information that may be communicated to the user includes the estimated cycle time, soil level setting or the status of a cycle modifier (e.g. pre-soak or extra rinse). Non-limiting examples of operating parameters that may be displayed include the wash and rinse temperature and the spin speed.

The operating parameters of a user-selected cycle of operation may be adjusted as a function of the weighting of each performance goal area 114, 116, 118 according to the location of the weighting selector 122 relative to the performance goal landscape 112. As illustrated in FIG. 4, the weighting selector 122 is centered about the intersection of the four goal areas 114, 116, 118 and 120 such that an equal portion of each goal area 114, 116, 118 and 120 is located within the weighting area 126.

When the weighting selector 122 is centered about the intersection of the four goal areas 114, 116, 118 and 120, the operating parameter settings for the cycle of operation may correspond to the default settings for the selected cycle prior to adjusting the cycle to achieve a desired performance goal. The operating parameters may be set so as to complete the cycle of operation according to the predetermined settings for the selected cycle of operation stored in the controller memory 70. The operating parameters for the pre-programmed cycles of operation may be set to provide the recommended treatment for the laundry according to the cycle selected. Depending on the operating cycle, the default settings for the operating parameters may already be set such that one or more performance goals is weighted more than the other.

For example, the predetermined settings for a "delicates" wash cycle typically combine a low-speed tumbling and a medium-speed spinning for a "gentler" wash cycle than a "normal/casual" wash cycle. However these settings may not necessarily result in a cycle that is quick. The user may alter the default weighting between the performance goals and give more weight to one or more performance goals relative to the other performance goals by moving the weighting selector 122 to adjust the relative proportion of each of the goal areas 114, 116, 118 and 120 within the weighting selector 126. For example, in the case of a "delicates" wash cycle, in which the predetermined operating parameters are set to achieve a gentle wash cycle, the user may desire to modify the "delicates" wash cycle so that it is quicker.

When the weighting selector 122 is positioned at the center of the four goal areas 114, 116, 118 and 120, the operating parameters may be set to the default settings for the selected cycle of operation, which may or may not balance the four performance goals, depending on the selected cycle. The user may alter the default weighting of the performance goals for the selected cycle by moving the weighting selector 122 away from the center of the four goal areas 114, 116, 118 and 120 to give more weight to one or more performance goals compared to the others.

Alternatively, when the weighting selector 122 is centered about the intersection of the four goal areas 114, 116, 118 and 120, the operating parameter settings for the cycle of operation may correspond to settings for the selected cycle that balance the four performance goals. The user may then use the weighting selector 122 to select a weighting of the performance goals and the settings for the operating parameters may be adjusted from the initial settings in which the performance goals are balanced to settings corresponding to the weighting of the performance goals selected by the user.

When a user selects a cycle of operation and then navigates to the performance goal selection screen 110, the weighting selector 122 may initially be positioned at the intersection of the four goal areas 114, 116, 118 and 120, such that the performance goals are balanced. Alternatively, the weighting selector 122 may initially be positioned such that it corresponds to the weighting of the performance goals based on the default operating parameters for the selected cycle of operation. A user may then move the weighting selector 122 to the intersection of the four goal areas 114, 116, 118 and 120 to balance the four performance goals, if desired.

The user may move the weighting selector 122 relative to the performance goal landscape 112 by contacting the touch screen 100 at an area corresponding to or adjacent to the weighting area 126 and moving the contact relative to the performance goal landscape 112 to a desired location. For example, the user may contact the touch screen 100 using a finger at an area of the touch screen 100 corresponding to the display of the weighting selector 122. The controller 14 may be programmed to detect a contact event within or adjacent to the weighting area 126. Once the contact event has been detected, movement of the contact results in a corresponding movement of the weighting selector 122, as is known in the art. In this manner, the user may move the weighting selector 122 to a desired location relative to the performance goal landscape 112.

Figure 5:
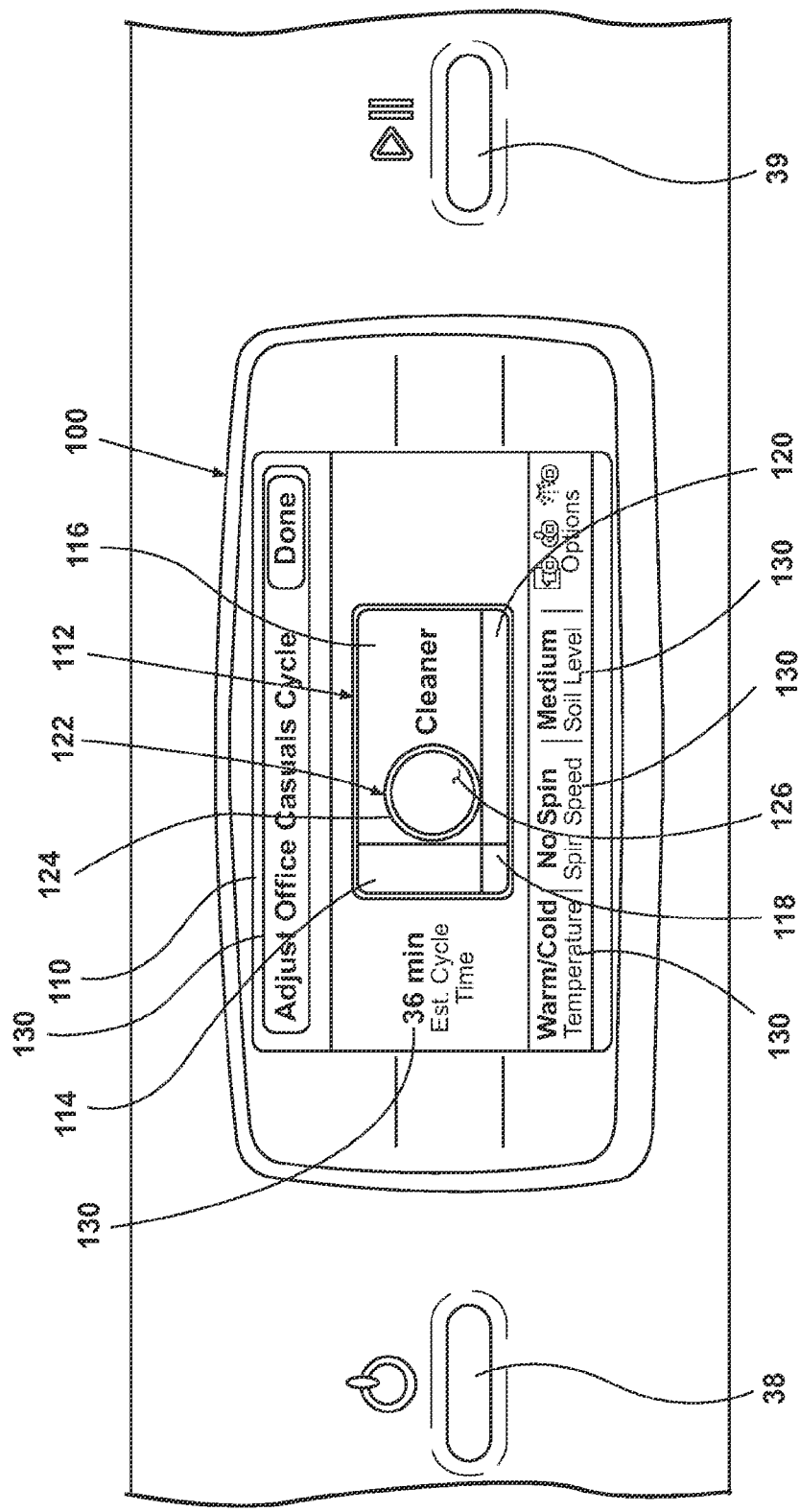
FIG. 5 is a front view of a user interface displaying a performance goal selection screen according to a third embodiment of the invention.

As illustrated in FIG. 5, the weighting selector 122 may be moved to select a performance goal in which the user weights a single performance goal as the highest priority and gives no weight to the other performance goals. For example, as illustrated in FIG. 5, the user weights the performance goal "Cleaner" as the highest priority, by moving the weighting selector 122 such that the entire weighting area 126 overlaps with the goal area 116 corresponding to the performance goal "Cleaner." Because the weighting area 126 does not overlap with any of the other goal areas, 114, 119 and 120, the user is selecting to give no weight to the corresponding performance goals. In this manner the user may weight "Cleaner" as the desired performance goal at the expense of the of the other performance goals. The controller 14 may adjust one or more operating parameters of the selected cycle as a function of the weighting selected by the user to achieve the performance goal indicated by the user.

Figure 6:
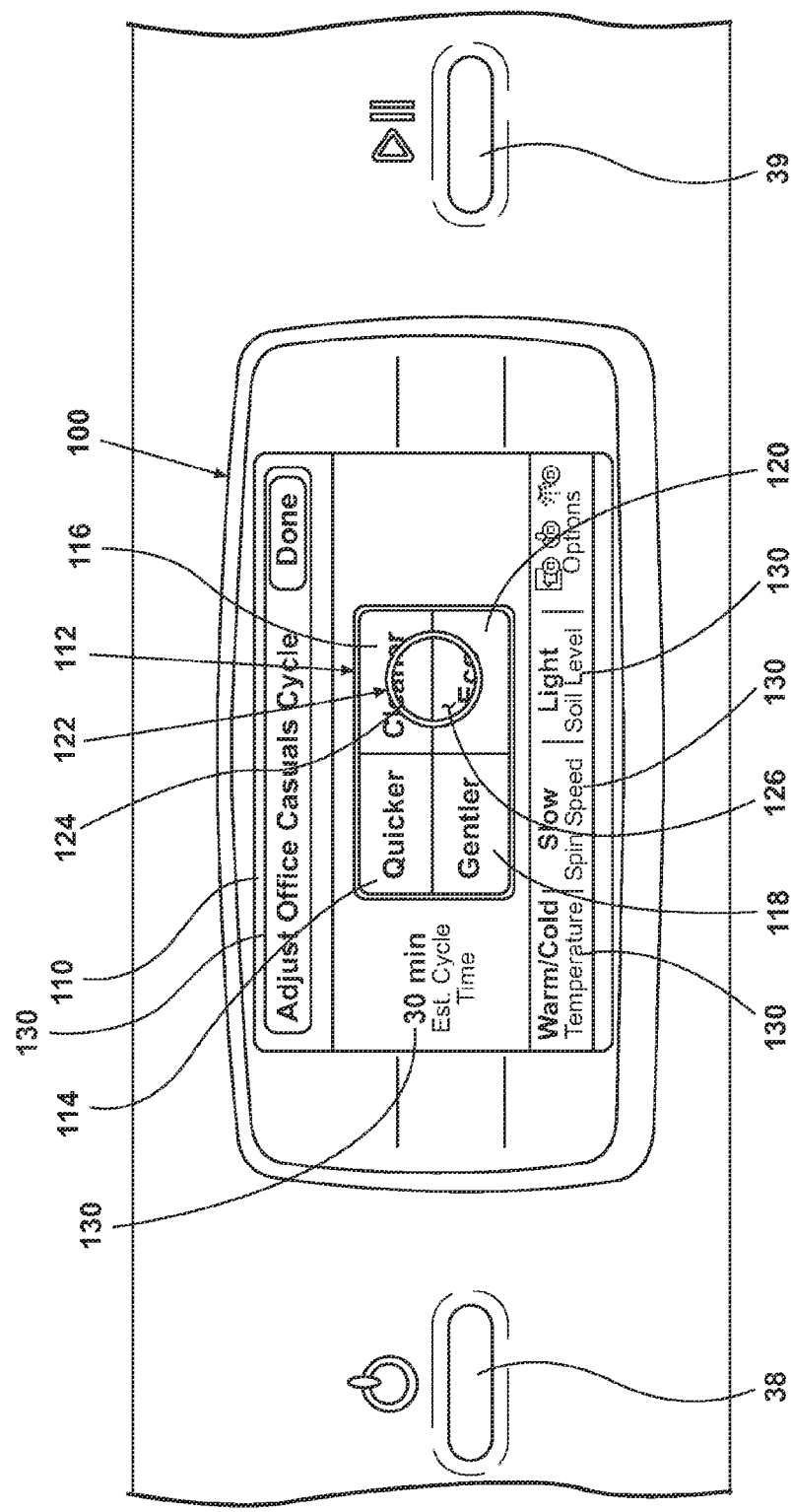
FIG. 6 is a front view of a user interface displaying a performance goal selection screen according to a fourth embodiment of the invention.

Referring now to FIG. 6, the user may use the weighting selector 122 to select two performance goals by moving the weighting selector 122 such that the weighting area 126 overlaps with a portion of two different goal areas. As illustrated in FIG. 6, the user may move the weighting selector 122 to modify the selected cycle such that more weight is given to achieving the performance goals of both "Cleaner" and "Eco." In this manner, the user may weight the performance goals of "Cleaner" and "Eco" as a higher priority than the other performance goals. The operating parameters of the selected cycle may be modified by the controller 14 as a function of the weighting selected by the user to achieve the desired performance goal of a cycle that is cleaner and more energy efficient. The weighting selector 122 may be moved over the performance landscape 112 such that an equal portion of two different goal areas 116 and 118 overlaps with the weighting area 126, as illustrated in FIG. 6, to give equal weight to two different performance goals. It is also within the scope of the invention for the weighting selector 122 to be positioned such that an unequal portion of two different goal areas overlaps with the weighting area 126, indicating that the user desires to give unequal weight to the two performance goals.

Figure 7:
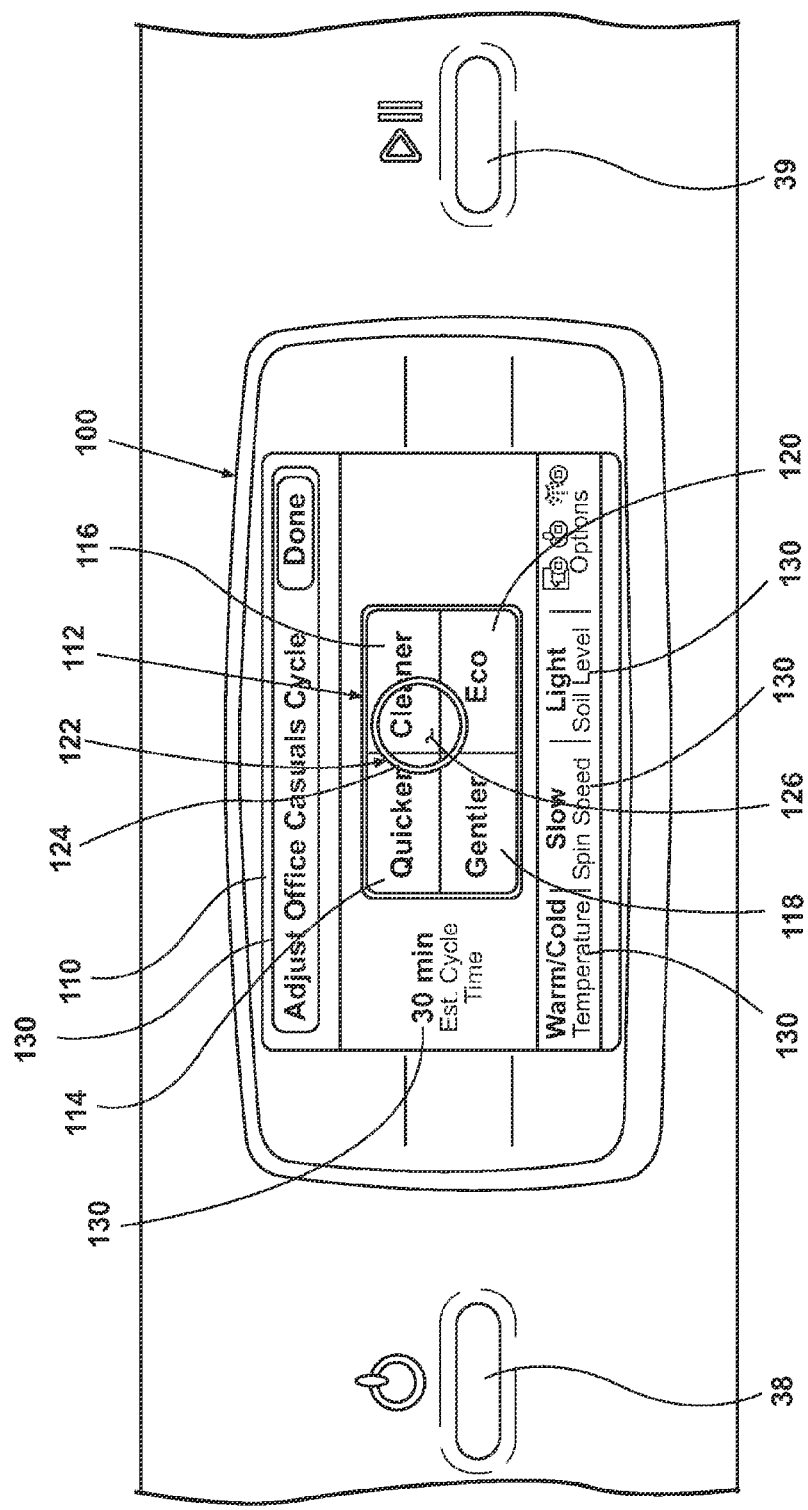
FIG. 7 is a front view of a user interface displaying a performance goal selection screen according to a fifth embodiment of the invention.

Referring now to FIG. 7, the user may use the weighting selector 122 to unequally weight all four of the goal areas 114, 116, 118 and 120. As illustrated in FIG. 7, the user may move the weighting selector 122 to modify a selected cycle such that all four performance goals are given some weight, although it may be unequal weight. In the illustrated example, the weighting selector 122 is positioned relative to the performance goal landscape 112 such that little weight is given to the performance goal "Gentler", some weight is given to the performance goals of "Quicker" and "Eco" and the majority of the weight is given to the performance goal "Cleaner."

While the invention is described in the context of the weighting selector 122 moving relative to the performance goal landscape 112, it is also within the scope of the invention for the weighting selector 122 to remain stationary and the performance goal landscape 112 may be moveable by the user relative to the weighting selector 122. The user may then adjust the weighting of the performance goals by moving the performance goal landscape 112 such that the goal areas 114, 116, 118 and 120 are within the weighting area 126, as desired. It is also within the scope of the invention for both the weighting selector 122 and the performance goal landscape 112 to be movable relative to the performance goal selection screen 110. For example, as illustrated in FIG. 5, as the weighting selector 122 is moved relative to the performance goal landscape 112 such that the entire weighting area 126 overlaps with goal area 116, the performance goal landscape 112 may shift such that that goal area 116 fills the entire portion of the screen on which the performance landscape is displayed.

The control software of the controller 14 may include a weighting module that is operably coupled with the input received from the touch screen 100 to set the operating parameters of the user-selected cycle of operation as a function of the user-selected weighting of the performance goals selected by the user through the performance goal selection screen 110. The weighting of the performance goals may be determined as a function of the relative proportion of each goal area 114, 116, 118 and 120 within or overlapping with the weighting area 126.

For example, the weighting given to each performance goal may be determined based on the relative amount of area of each goal area 114, 116, 118 and 120 within the weighting area 126. In the example illustrated in FIG. 5, the weighting area 126 overlaps entirely with goal area 116 and does not overlap at all with any of the other goal areas 114, 118 and 120. The weighting module may determine a 100% weighting of the performance goal corresponding to goal area 116 and a 0% weighting of the other performance goals. The weighting module may then set one or more operating parameters based on the 100% weighting of "Cleaner" and the 0% weighting of the other performance goals "Quicker", "Gentler" and "Eco."

When the user selects multiple performance goals, such as illustrated in FIG. 6, the weighting module may determine the settings for one or more operating parameters as a function of the weight given to each performance goal based on the relative amount of area of each goal area within the weighting area 126. For example, if 50% of the weighting area 126 overlaps with goal area 116 and 50% of the weighting area 126 overlaps with goal area 120, the weighting module may determine the settings for at least one operating parameter based on the equal weighting between the two goal areas 114 and 116 and give no weight to the other performance goals. As the amount of area of a goal area 114, 116, 118 and 120 within the weighting area 126 increases, the weighting given to that goal area increases.

The determination of the relative proportion of each goal area 114, 116, 118 and 120 within the weighting area 126 may be based on the amount of area of each goal area within the weighting area 126 or the amount of area of each goal area outside of the weighting area 126. The determination of an area of a goal area 114, 116, 118 and 120 either within the weighting area 126 or outside the weighting area 126 may be an absolute determination of an area or a relative determination of an area. For example, an absolute determination of an area may be based on the number of pixels forming the area. Alternatively, the area may be determined as a function of the amount of the goal area within or outside the weighting area 126 relative to the total area of each goal area. For example, if 75% of a goal area lies outside the weighting area 126, it may be determined that 25% of the goal area lies within the weighting area 126.

The weighting given to each goal area 114, 116, 118 and 120 within the weighting area 126 may be part of a discrete or continuous scale. For example, the weighting given to a goal area 114, 116, 118 and 120 may be limited to predetermined increments, such as 0%, 25%, 50%, 75% and 100%. When the user selects a weighting through the location of the weighting selector 122, the weighting selector 122 may be controlled to "snap-to" a location such that the relative proportion of each goal area 114, 116, 118 and 120 within the weighting area 126 is representative of the predetermined weighting increment that is closest to that selected by the user. Alternatively, the movement of the weighting selector 122 and the weighting given to each goal area 114, 116, 118 and 120 may be based on a continuous scale from 0 to 100.

The weighting module may determine the setting for one or more operating parameters as a function of the determined weighting for each performance goal by consulting a look-up table of weightings and corresponding values that may be stored in the memory 70 of the controller 14. The operating parameter may be set to a value in the table corresponding to a weighting in the table that most closely matches the determined weighting based on the user's selection. Alternatively, the look-up table may include a range of weightings and corresponding vales and the operating parameter may be set to a value in the table corresponding to the range of weightings in the table that coincides with the determined weighting.

The modification of one or more operating parameters may or may not be directly proportional to the relative weighting of a performance goal. The relative weighting may be used to determine a value using a look-up table, for example, in which the values are not directly proportional to the relative weighting. In another example, the weighting module may set a value for one or more operating parameters to a value that is directly proportional to the determined weighting of the performance goals. For example, the number of rinses for a given cycle may be directly proportional to the weighting a user gives to the performance goal "Cleaner"; as the weighting increases, the number of rinses may increase.

While the weightings of the performance goals are described in the context of percentages, the weighting module may determine the relative proportion of each goal area 114, 116, 118 and 120 within or overlapping with the weighting area 126 in any suitable manner. For example, the relative proportion of each goal area 114, 116, 118 and 120 may be determined as a function of a number of pixels within the weighting area 126.

In addition, if the user selects a performance goal weighting that may create an environment that damages the laundry and/or machine, the control software may be programmed to alert the user of the potential damage and/or modify one or more operating parameters to avoid damaging the laundry and/or machine.

While the invention has been described in the context of first selecting a cycle of operation and then setting the performance goal weighting for the selected cycle, it is also within the scope of the invention for a user to first select a desired performance goal weighting and then select a cycle of operation. In the latter case, the operating parameters for the user-selectable cycles of operation will automatically be modified to achieve the selected performance goal and the information displayed to the user through the output displays 130 may automatically be adjusted accordingly.

The invention described herein provides the user with an opportunity to modify a cycle of operation to achieve a desired performance goal. The laundry treating appliance may automatically adjust one or more operating parameters of a cycle of operation to achieve the desired performance goal. Modifying a cycle of operation according to a user-selected performance goal may make the operating cycle more efficient by controlling the operation of the laundry treating appliance according to the user's specific needs and may also lead to increased user satisfaction.

In addition, providing the user with an interactive graphic through which the user may select a desired performance goal may make the selection process more intuitive and informative for the user, further increasing user satisfaction and appliance efficiency.

While the invention has been specifically described in connection with certain specific embodiments thereof, it is to be understood that this is by way of illustration and not of limitation, and the scope of the appended claims should be construed as broadly as the prior art will permit.

What is claimed is:

1. A laundry treating appliance for treating laundry received within a treating chamber of the appliance according to at least one cycle of operation, from a plurality of cycles of operation, having multiple operating parameters, the laundry treating appliance comprising:
    a plurality of controllable components operable to implement the cycle of operation;
    a user interface comprising:
        a cycle selector for selecting a cycle of operation from the plurality of cycles of operation; and
        a performance goal selector comprising:
            an image display on which is provided a performance goal landscape subdivided into multiple goal areas, each goal area representing a different performance goal for at least one of the plurality of cycles of operation; and
            a user-controllable weighting selector having a bound weighting area moveable relative to the performance goal landscape; and
    a control system operably coupled to the user interface and comprising:
        a weighting module operably coupled with the user interface and comprising a set of executable instructions to determine a goal weighting based on a relative proportion of at least one of the goal areas within the weighting area; and
        a controller configured to set a value for at least one of the multiple operating parameters based on the determined goal weighting and to control at least one of the plurality of components to implement the cycle of operation based on the set value for the at least one of the multiple operating parameters;
    wherein the user may control the performance goals of the cycle of operation by moving the weighting selector relative to the landscape to change the goal weighting by changing a relative proportion of the goal areas within the weighting area.

2. The laundry treating appliance of claim 1 wherein the weighting selector is an image of a bubble.

3. The laundry treating appliance of claim 2 wherein the weighting area is the area bound by the image of the bubble.

4. The laundry treating appliance of claim 1, further comprising providing each goal area with indicia indicating a corresponding performance goal.

5. The laundry treating appliance of claim 1 wherein the landscape comprises an origin point common to all of the goal areas.

6. The laundry treating appliance of claim 1 wherein the landscape comprises a plurality of polygonal sections, with each polygonal section forming a goal area.

7. The laundry treating appliance of claim 1 wherein the landscape comprises a grid, with rectangular polygonal sections.

8. The laundry treating appliance of claim 1 wherein the performance goals are qualitative and the operating parameters are quantitative.

9. The laundry treating appliance of claim 1 wherein the control system is further configured to provide the set value to the user interface for display on the image display.

10. The laundry treating appliance of claim 1 wherein the weighting module is configured to determine the goal weighting based on a relative proportion of each goal area within the weighting area.

11. The laundry treating appliance of claim 1 wherein the controller comprises a table of goal weightings and corresponding values.

12. The laundry treating appliance of claim 11 wherein the goal weightings in the table of goal weightings and corresponding values comprises a range of goal weightings.

13. The laundry treating appliance of claim 11 wherein the table comprises multiple values for setting a value for more than one of the multiple operating parameters corresponding to each goal weighting in the table.

* * * * *